(12) United States Patent
Oshiyama et al.

(10) Patent No.: US 11,755,329 B2
(45) Date of Patent: Sep. 12, 2023

(54) ARITHMETIC PROCESSING APPARATUS AND METHOD FOR SELECTING AN EXECUTABLE INSTRUCTION BASED ON PRIORITY INFORMATION WRITTEN IN RESPONSE TO PRIORITY FLAG COMPARISON

(71) Applicant: FUJITSU LIMITED, Kawasaki (JP)

(72) Inventors: Gen Oshiyama, Kawasaki (JP); Sota Sakashita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/701,209

(22) Filed: Dec. 3, 2019

(65) Prior Publication Data
US 2020/0183684 A1   Jun. 11, 2020

(30) Foreign Application Priority Data
Dec. 6, 2018   (JP) .................................. 2018-229404

(51) Int. Cl.
*G06F 9/38*   (2018.01)
(52) U.S. Cl.
CPC .................................. *G06F 9/3836* (2013.01)
(58) Field of Classification Search
CPC ...................................................... G06F 9/3836
See application file for complete search history.

(56) References Cited

U.S. PATENT DOCUMENTS

| | | | |
|---|---|---|---|
| 6,785,802 B1 * | 8/2004 | Roy ...................... | G06F 9/3836 712/216 |
| 8,380,964 B2 * | 2/2013 | Bishop .................. | G06F 9/3855 712/214 |

(Continued)

FOREIGN PATENT DOCUMENTS

| JP | 2009-076083 A | 4/2009 |
|---|---|---|
| JP | 2016-224796 A | 12/2016 |

(Continued)

OTHER PUBLICATIONS

Subbarao Palacharla et al., "Complexity-Effective Superscalar Processors", ISCA1997, pp. 1-13 (13 pages).

Dana S. Henry et al., Yale University Departments of Computer Science and Electrical Engineering, "Circuits for Wide-Window Superscalar Processors" ISCA2000 (12 pages).

Peter G. Sassone et al., "Matrix Scheduler Reloaded", Appears in the Proceedings of the 34th International Symposium on Computer Architecture (ISCA-34), 2007 (12 pages).

(Continued)

*Primary Examiner* — David J. Huisman
(74) *Attorney, Agent, or Firm* — Fujitsu Patent Center

(57) ABSTRACT

An arithmetic processing apparatus includes an instruction execution control circuit that outputs an instruction from an entry of entries, including an executable instruction information storage circuit storing executable instruction information indicating whether an instruction in each of the entries is executable, a priority information storage circuit including, for each entry, storage areas storing priority information indicating whether an instruction in an entry has higher priority on an entry-by-entry basis, an executable instruction information write circuit writing the executable instruction information in response to determining whether an instruction in each of the entries is executable, a priority information write circuit writing the priority information in response to determining whether an instruction in each of the entries has higher priority, and an output determination circuit selecting an entry from which an instruction is output on a basis of the executable instruction information and the priority information.

9 Claims, 10 Drawing Sheets

(56) References Cited

U.S. PATENT DOCUMENTS

| | | | |
|---|---|---|---|
| 9,983,879 B2* | 5/2018 | Brownscheidle | G06F 9/3836 |
| 10,120,690 B1* | 11/2018 | Srinivasa | G06F 1/3243 |
| 2010/0095305 A1 | 4/2010 | Akizuki | |
| 2016/0357552 A1 | 12/2016 | Sakashita et al. | |
| 2017/0024205 A1* | 1/2017 | Kountanis | G06F 9/3836 |
| 2019/0163488 A1* | 5/2019 | Karve | G06F 9/3855 |

FOREIGN PATENT DOCUMENTS

| | | |
|---|---|---|
| WO | 96/25705 A1 | 8/1996 |
| WO | 2008/155804 A1 | 12/2008 |

OTHER PUBLICATIONS

Japanese Office Action dated Aug. 2, 2022 for corresponding Japanese Patent Application No. 2018-229404, with English Translation, 5 pages.

* cited by examiner

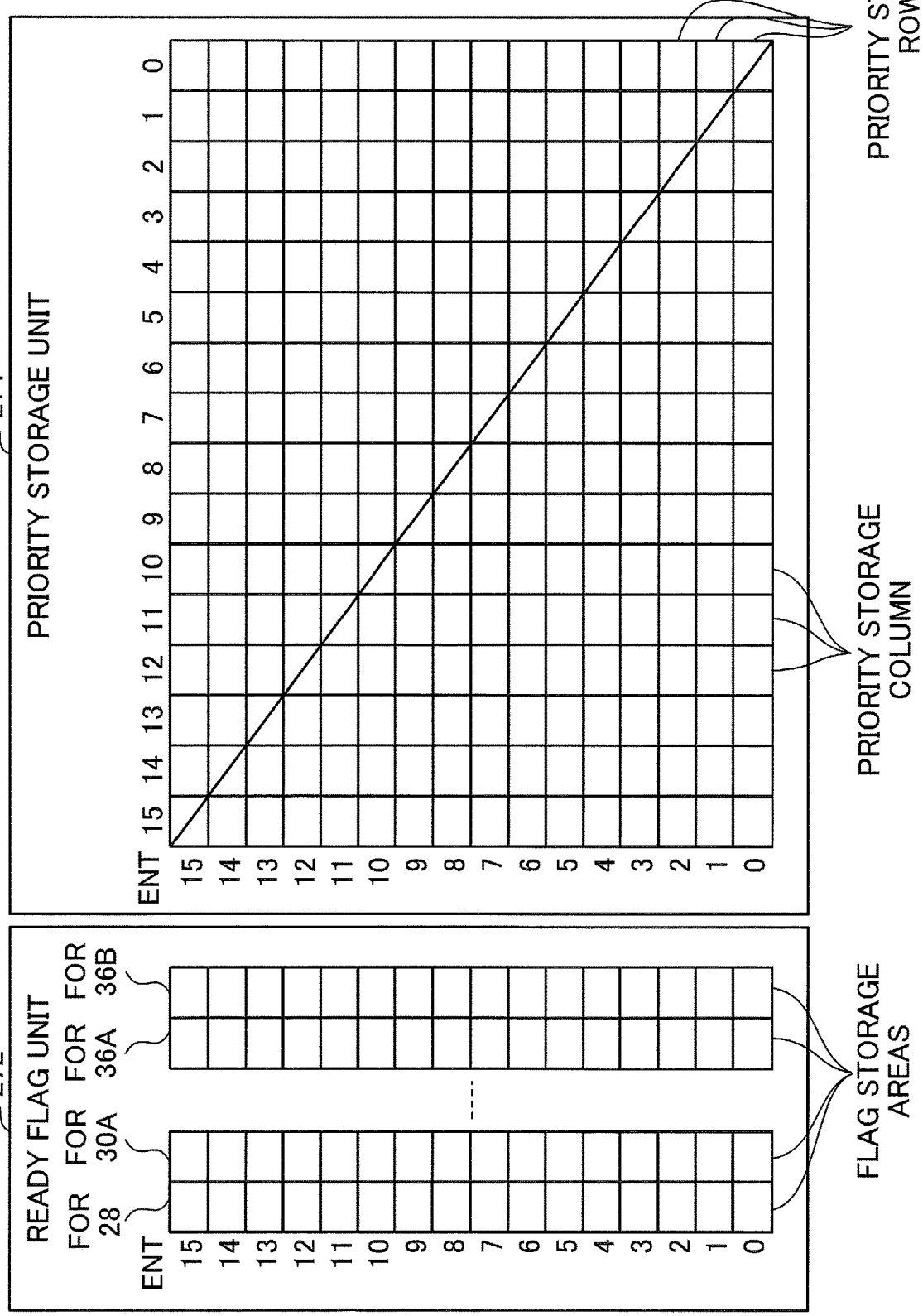

FIG.6

| INSTRUCTION TARGETED TO BE ISSUED | AT LEAST ONE OF THE OTHER INSTRUCTIONS HAS A HIGHER PRIORITY | | NONE OF THE OTHER INSTRUCTIONS HAS A HIGHER PRIORITY |
|---|---|---|---|
| | AT LEAST ONE OF THE OTHER INSTRUCTIONS HAS A HIGHER PRIORITY AND READY | THE OTHER INSTRUCTIONS WITH A HIGHER PRIORITY ARE NOT READY | (WHETHER STATE OF THE OTHER INSTRUCTIONS IS READY IS NOT CHECKED) |
| READY | (d) DO NOT OUTPUT SEL | (e) OUTPUT SEL (ISSUE INSTRUCTION) | (f) OUTPUT SEL (ISSUE INSTRUCTION) |
| NOT READY | (a) DO NOT OUTPUT SEL | (b) DO NOT OUTPUT SEL | (c) DO NOT OUTPUT SEL |

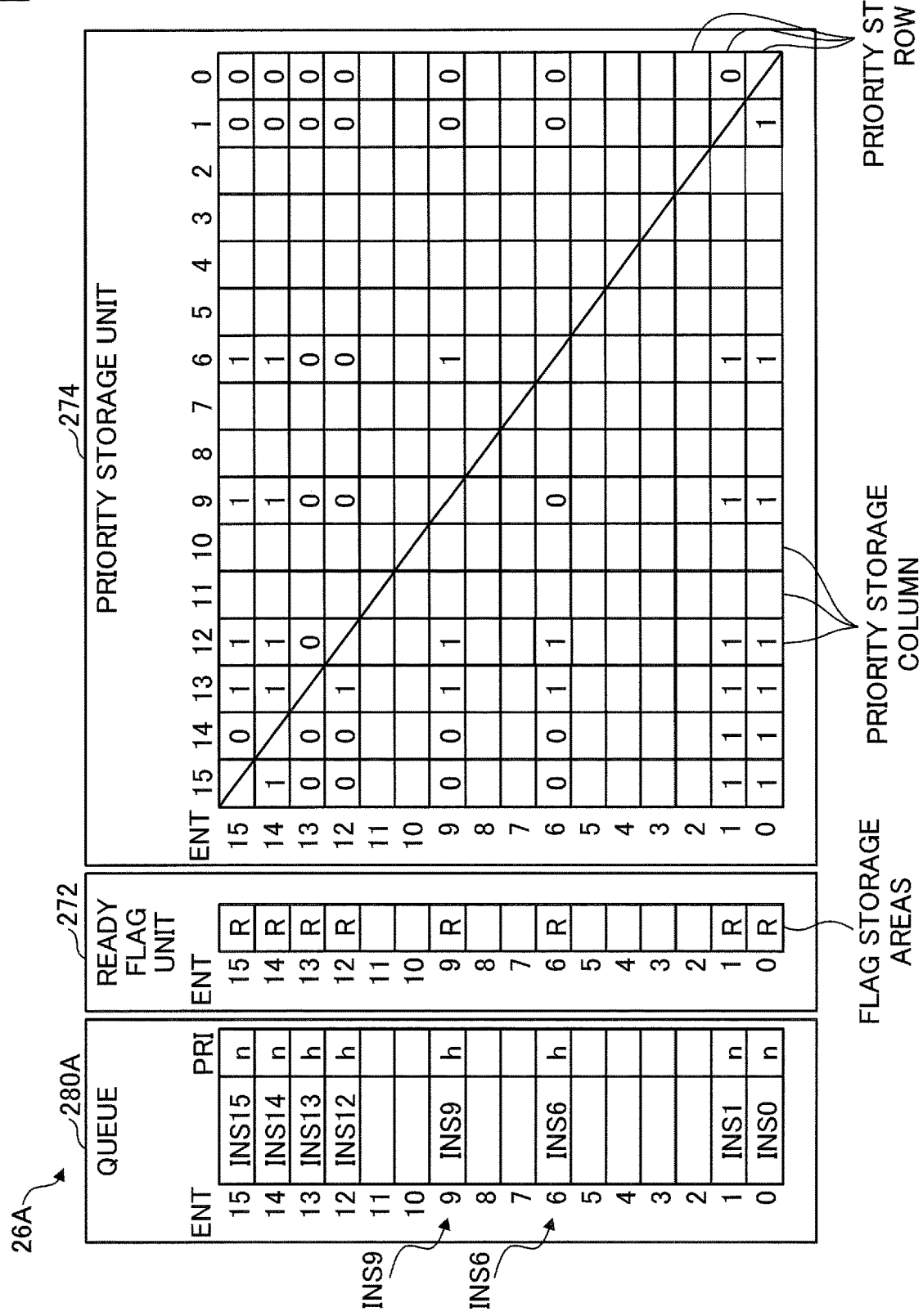

ARITHMETIC PROCESSING APPARATUS AND METHOD FOR SELECTING AN EXECUTABLE INSTRUCTION BASED ON PRIORITY INFORMATION WRITTEN IN RESPONSE TO PRIORITY FLAG COMPARISON

CROSS-REFERENCE TO RELATED APPLICATIONS

The present application is based upon and claims the benefit of priority from the prior Japanese Patent Application No. 2018-229404 filed on Dec. 6, 2018, with the Japanese Patent Office, the entire contents of which are incorporated herein by reference.

FIELD

The disclosures herein relate to an arithmetic processing apparatus and a method of controlling an arithmetic processing apparatus.

BACKGROUND

Performance of an arithmetic processing apparatus is improved by various methods such as instruction pipelining, out-of-order instruction execution, speculative instruction execution, register renaming, superscalar, and multithreading. In order to perform out-of-order instruction execution, an arithmetic processing apparatus includes an issue queue of instructions called a reservation station.

A process of recovering to an original state at an exception is important to avoid performance degradation of an arithmetic processing apparatus. When an exception is detected, for example, contents of logical registers are returned to a state that existed at an execution of a checkpoint instruction, by using information that has been saved by the checkpoint instruction subsequent to an instruction causing the exception. (Patent Document 1)

In an instruction completion process using a commit stack entry to control an instruction completion, one thread for which an instruction completion is determined is selected from a commit stack entry and stored in an completion target entry. When the thread stored in the completion target entry is determined to be completed, programmable resources of the thread are updated. (Patent Document 2)

An arithmetic processing apparatus may include a reservation station to issue instructions decoded by an instruction decoder in the "in-order" sequence, to an arithmetic unit or the like in the "out-of-order" sequence. The reservation station buffers instructions decoded by the instruction decoder in a queue, checks dependencies among the instructions stored in the queue. The reservation station selects an instruction to be issued, from executable instructions whose dependencies are resolved, and issues an instruction to an arithmetic unit or the like.

The more entries of a queue a reservation station has, or the more issue ports to issue an instruction a reservation station has, the more logic operations an instruction selection needs and the longer an instruction selection is, for example. Operation latency is one cycle at a minimum and an instruction is necessary to be issued every cycle. Consequently, the number of entries of a queue and the number of issue ports are limited by a length of time required to select an instruction and a length of time required to check dependencies. Performance of an arithmetic processing apparatus is degraded if the number of entries of a queue is decreased or the number of issue ports is decreased.

RELATED-ART DOCUMENTS

Patent Document

[Patent Document 1] Japanese Laid-open Patent Publication No. 2009-76083
[Patent Document 2] International Publication Pamphlet No. WO 2008/155804

SUMMARY

An arithmetic processing apparatus includes an instruction decoding circuit configured to decode an instruction, an instruction execution control circuit configured to store an instruction decoded by the instruction decoding circuit in an entry of entries, and configured to output an executable instruction from an entry of the entries, and an instruction execution circuit configured to execute the executable instruction output from the instruction execution control circuit, wherein the instruction execution control circuit includes an executable instruction information storage circuit configured to store executable instruction information that indicates whether an instruction stored in each of the entries is executable, a priority information storage circuit configured to include, separately for each of the entries, storage areas in which priority information is stored, such that the priority information stored in the storage areas for a given entry of the entries indicates whether an instruction stored in the given entry has higher priority than one or more other instructions currently being stored in the entries on an entry-by-entry basis, an executable instruction information write circuit configured to write the executable instruction information to the executable instruction information storage circuit in response to determining whether an instruction stored in each of the entries is executable by the instruction execution circuit, a priority information write circuit configured to write the priority information to the priority information storage circuit in response to determining whether an instruction to be stored in each of the entries has higher priority than one or more other instructions currently being stored in the entries, and an output determination circuit configured to select an entry of the entries from which an instruction is output on a basis of the executable instruction information stored in the executable instruction information storage circuit and the priority information stored in the priority information storage circuit.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 5 is a drawing illustrating an example of a ready flag unit and a priority storage unit in FIG. 4;

FIG. 6 is a drawing illustrating an example of an operation of an issue control unit in FIG. 4;

FIG. 10 is a drawing illustrating an example of a reservation station in an arithmetic processing apparatus of another embodiment.

DESCRIPTION OF EMBODIMENTS

In the following, embodiments will be described with reference to the accompanying drawings.

Figure 1:
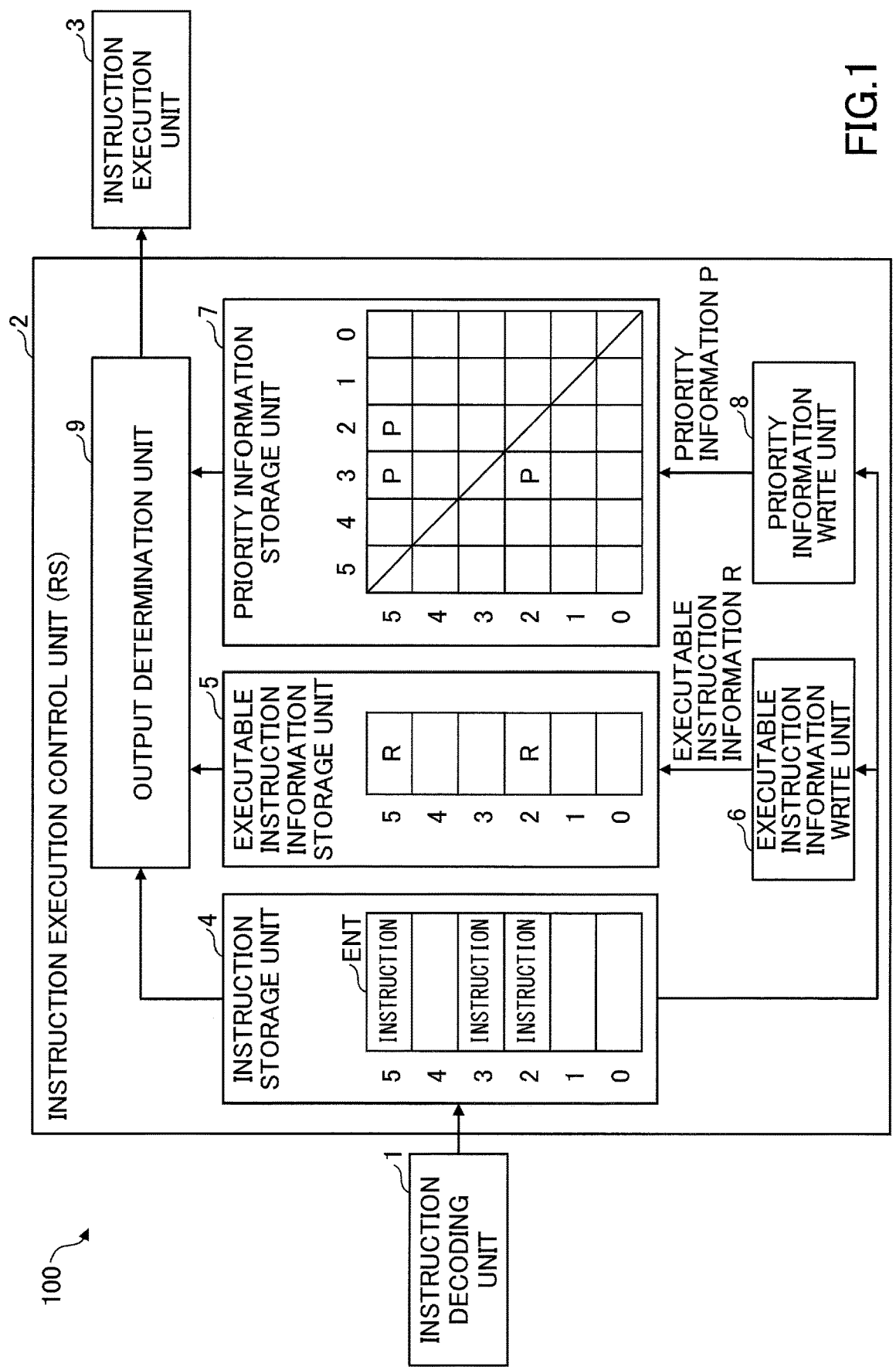
FIG. 1 is a drawing illustrating an example of an arithmetic processing apparatus of an embodiment.

FIG. 1 illustrates an example of an arithmetic processing apparatus of an embodiment. An arithmetic processing apparatus 100 in FIG. 1 includes an instruction decoding unit 1 (i.e., an instruction decoding circuit 1) that decodes an instruction, an instruction execution control unit 2 (i.e., an instruction execution control circuit 2), and an instruction execution unit 3 (i.e., an instruction execution circuit 3) that executes an instruction output from the instruction execution control unit 2. The instruction execution control unit 2 outputs an executable instruction successively from instructions stored in a plurality of entries ENT to the instruction execution unit 3. The instruction execution control unit 2 may be a reservation station RS, for example. The instruction execution control unit 2 includes an instruction storage unit 4, an executable instruction information storage unit 5 (i.e., an executable instruction information storage circuit 5), an executable instruction information write unit 6 (i.e., an executable instruction information write circuit 6), a priority information storage unit 7 (i.e., a priority information storage circuit 7), a priority information write unit 8 (i.e., a priority information write circuit 8), and an output determination unit 9 (i.e., an output determination circuit 9).

The instruction storage unit 4 includes a plurality of entries ENT each storing an instruction decoded by the instruction decoding unit 1 (i.e., instruction data indicating a decoded result). The number of entries ENT is not limited to six. In the following, instruction data indicating a decoded result decoded by the instruction decoding unit 1 will be also referred to as an instruction.

The executable instruction information storage unit 5 includes a storage area for each entry ENT, that stores executable instruction information R (i.e., Ready) indicating whether an instruction stored in a corresponding ENT is executable. The executable instruction information write unit 6 checks a dependency of an instruction stored in an entry ENT based on instructions stored in the remaining entries ENT. The executable instruction information write unit 6 writes the executable instruction information R, which indicates that an instruction can be executed by the instruction execution unit 3, to a storage area corresponding to an entry ENT that stores an instruction whose dependency is resolved, in the executable instruction information storage unit 5. Resolution of a dependency is disappearance of a data dependency between a preceding instruction and a subsequent instruction, for example.

An example in FIG. 1 describes that instructions stored in the fifth and second entries ENT have their dependencies resolved and can be executed by the instruction execution unit 3, as the executable instruction information R is written to corresponding areas of the executable instruction information storage unit 5. However, the instruction stored in a third entry ENT does not have its dependency resolved and cannot be executed by the instruction execution unit 3, as the executable instruction information R is not written to a corresponding area of the executable instruction information storage unit 5.

The priority information storage unit 7 includes a plurality of storage areas in which priority information P is stored, separately for each of entries ENT, such that the priority information P in the storage areas for a given entry ENT indicates whether an instruction stored in the given entry ENT has higher priority than one or more instructions currently being stored in the entries ENT on an entry-by-entry basis. In the priority information storage unit 7, the priority information P stored in a row of the storage areas for a given entry ENT (e.g., 5) indicates that an instruction stored in an entry ENT corresponding to each column of the storage areas (e.g., 2 and 3) has higher priority than an instruction stored in the given entry ENT.

The priority information P in the priority information storage unit 7 may be represented by a square matrix. Diagonal entries depicted by a diagonal line indicate pairs of the same entry ENT, and the priority information P is not written therein. The priority information /P indicating relatively low priority may be written to the priority information storage unit 7 instead of the priority information P, for example. In this case, the priority information storage unit 7 may include only a triangle area at the upper right of the diagonal line or a triangle area at the lower left of the diagonal line because the priority information P and /P always form a pair at their respective positions symmetric to the diagonal line.

The priority information P stored in a first row corresponding to an entry ENT5 of the priority information storage unit 7 indicates that instructions stored in entries ENT3 and ENT2 are given higher priority than an instruction stored in the entry ENT5. The priority information P stored in a fourth row corresponding to an entry ENT2 of the priority information storage unit 7 indicates that the instruction stored in the entry ENT3 is given higher priority than the instruction stored in the entry ENT2. Thus, the priority information P stored in the priority information storage unit 7 indicates that the entries ENT3, ENT2 and ENT5 are in order of high to low priority.

The priority information write unit 8 writes the priority information P in the priority information storage unit 7 in response to determining relative priority of instructions based on a priority level of an instruction to be stored as a new entry ENT and a priority level of each of instructions stored in existing entries ENT. The priority information write unit 8 determines a priority level based on an instruction decoding order (i.e., a program execution order), an instruction to which higher priority is given in advance compared with another instruction, or the like. The priority information write unit 8 writes the priority information P to the priority information storage unit 7 by ensuring consistency among priority stored in rows. As a result, the order of the priority from the entry ENT5 to ENT0 can be uniquely determined.

The output determination unit 9 selects an entry of the entries ENT, which store instructions, from which an instruction is issued based on the priority information P stored in the priority information storage unit 7 and the executable instruction information R stored in the executable instruction information storage unit 5. For example, the output determination unit 9 selects an instruction with highest priority based on the priority information P stored in the priority information storage unit 7 among the instructions associated with the executable instruction information R stored in the executable instruction information storage unit 5, stored in the instruction storage unit 4, and issues the instruction. According to an example illustrated in FIG. 1, the output determination unit 9 does not issue the instruction stored in the entry ENT3 because the instruction is not executable even though the instruction is given highest priority. Instead, the output determination unit 9 issues the instruction stored in the entry ENT2 that is given second priority and is executable.

In the following, an example of an instruction pipeline when an arithmetic instruction 1 and an arithmetic instruction 2 that are completed in 1 cycle (i.e., an operation latency is 1) are executed in order will be described.

$P\ B\ X$ (Arithmetic instruction 1)

$u\ P\ B\ X$ (Arithmetic instruction 2)

The P (i.e., Priority) cycle is a cycle that selects an instruction to be output to an operation execution unit from subsequent instructions whose dependencies are resolved, and broadcasts to transmit the selected instruction. Thus, in the P cycle, one of instructions whose dependencies are resolved is selected by the output determination unit 9. The B (i.e., Buffer) cycle is a cycle that determines registers storing data required to execute an arithmetic operation, and reads data (i.e., a source operand) from the registers. The X (i.e., Execute) cycle is a cycle that executes the arithmetic operation and outputs a result of the arithmetic operation.

The "u" that is executed during a cycle previous to the P cycle indicates a process performed to check whether dependencies of subsequent instructions are resolved, which includes a process performed by the executable instruction information write unit 6 for example. In order to execute instructions with latency of 1 in an instruction pipeline without any intervals, the B cycle of the subsequent arithmetic instruction 2 is required to be synchronized with the X cycle of the preceding arithmetic instruction 1. Thus, the operation "u" that checks a dependency of the subsequent arithmetic operation 2 is performed during the P cycle of the preceding arithmetic instruction 1.

In this example, as the dependencies of the arithmetic instruction 1 and the arithmetic instruction 2 are resolved, the P cycle of the arithmetic instruction 2 is executed in the same cycle as the B cycle of the arithmetic instruction 1. Thus, when instructions with latency 1 are executed in the "in-order" sequence, the operation "u" is performed during the P cycle of the preceding arithmetic instruction 1, and the subsequent arithmetic instruction 2 is selected to be issued. An operation that selects the subsequent arithmetic instruction 2 to be issued in one cycle may be referred to as a B2B (Back-to-Back) scheduling, and this operation requires the strictest timing in operations of an instruction pipeline. Thus, a clock cycle of the arithmetic processing apparatus 100 may be determined in accordance with a length of time required for the B2B scheduling.

When the executable instruction information write unit 6 determines not to output the executable instruction information R, the checking operation "u" is repeated every cycle until the executable instruction information write unit 6 determines to output the executable instruction information R. For example, when the operation "u" of the arithmetic instruction 2 is executed in the B cycle of the arithmetic instruction 1 and the P cycle of the arithmetic instruction 2 is executed in the X cycle of the arithmetic instruction 1, as a dependency of the arithmetic instruction 2 is not resolved, no operation cycle, which is called a bubble, is caused in an instruction pipeline. When the operation "u" occurs in a plurality of cycles, efficiency of an arithmetic operation is decreased.

In the following, an example of an instruction pipeline when an arithmetic instruction 3 and an arithmetic instruction 4 that are completed in 2 cycles (i.e., an operation latency is 2) are executed in order will be described.

$P\ B\ X1\ X2$ (Arithmetic instruction 3)

$u\ P\ B\ X1\ X2$ (Arithmetic instruction 4)

Instructions with latency of 2 can be executed without any intervals by synchronizing the B cycle of the subsequent arithmetic instruction 4 with X2 cycle of the preceding arithmetic instruction 3. The operation "u" that checks a dependency of the subsequent arithmetic instruction 4 is only required to be executed in the B cycle of the preceding arithmetic instruction 3, and there is a margin of time, compared with instructions with latency of 1.

A clock frequency is determined depending on a cycle that needs the longest processing time length among cycles (i.e., pipeline stages) in design of an instruction pipeline, for example. A cycle that substantially needs the longest processing time length is the P cycle that executes the B2B scheduling. When a length of time to perform the B2B schedule exceeds a predetermined length of time, the processing time length needs to be decreased by reducing the number of logical stages of a circuit. The number of logical stages of the circuit can be reduced by decreasing the number of issue ports, decreasing the number of entries of a reservation station, or limiting the entries ENT that can join arbitration. However, in this case, a processing capacity of a reservation station (i.e., the number of instructions that can be executed in the out-of-order sequence) is reduced and performance of an arithmetic processing apparatus is degraded.

Alternatively, providing a reservation station for each arithmetic pipeline can decrease the number of entries of the reservation station. This reduces the number of logical stages of a circuit to select an instruction to be issued in the reservation station, and decreases a processing time length. However, performance of an arithmetic operation is decreased when the number of instructions allocated to a same type of arithmetic units is unbalanced. In a plurality of types of the arithmetic units (e.g., the arithmetic units for fixed-point operations and for floating-point operations), processing frequency of one arithmetic unit may be quite different from processing frequency of another arithmetic unit (i.e., unbalanced work load). In this case, the number of all the entries of a plurality of the reservation stations appears to be decreased and performance is degraded.

According to the embodiment illustrated in FIG. 1, the output determination unit 9 selects an instruction to be issued, based on the priority information P in a simple table form (i.e., a matrix form) stored in the priority information storage unit 7. This can reduce the number of logical stages of a circuit to select an instruction to be issued, compared with an instruction execution control unit such as an existing reservation station. A margin of time is created for the B2B schedule by reducing the number of the logical stages of a circuit, for example, and a delay time length required for a stage that selects the instruction to be issued by the instruction execution control unit can be shortened in an instruction pipeline of an arithmetic processing apparatus.

When a margin of time is created for the B2B schedule, the number of entries of the reservation station can be increased, or the number of entries that are able to join arbitration can be increased, for example. As a result, the number of instructions that can be executed in the out-of-order sequence can be increased and performance of the arithmetic processing apparatus 100 can be improved. When the number of entries is not increased, a clock frequency of the arithmetic processing apparatus 100 can be increased and performance can be improved.

Figure 2:
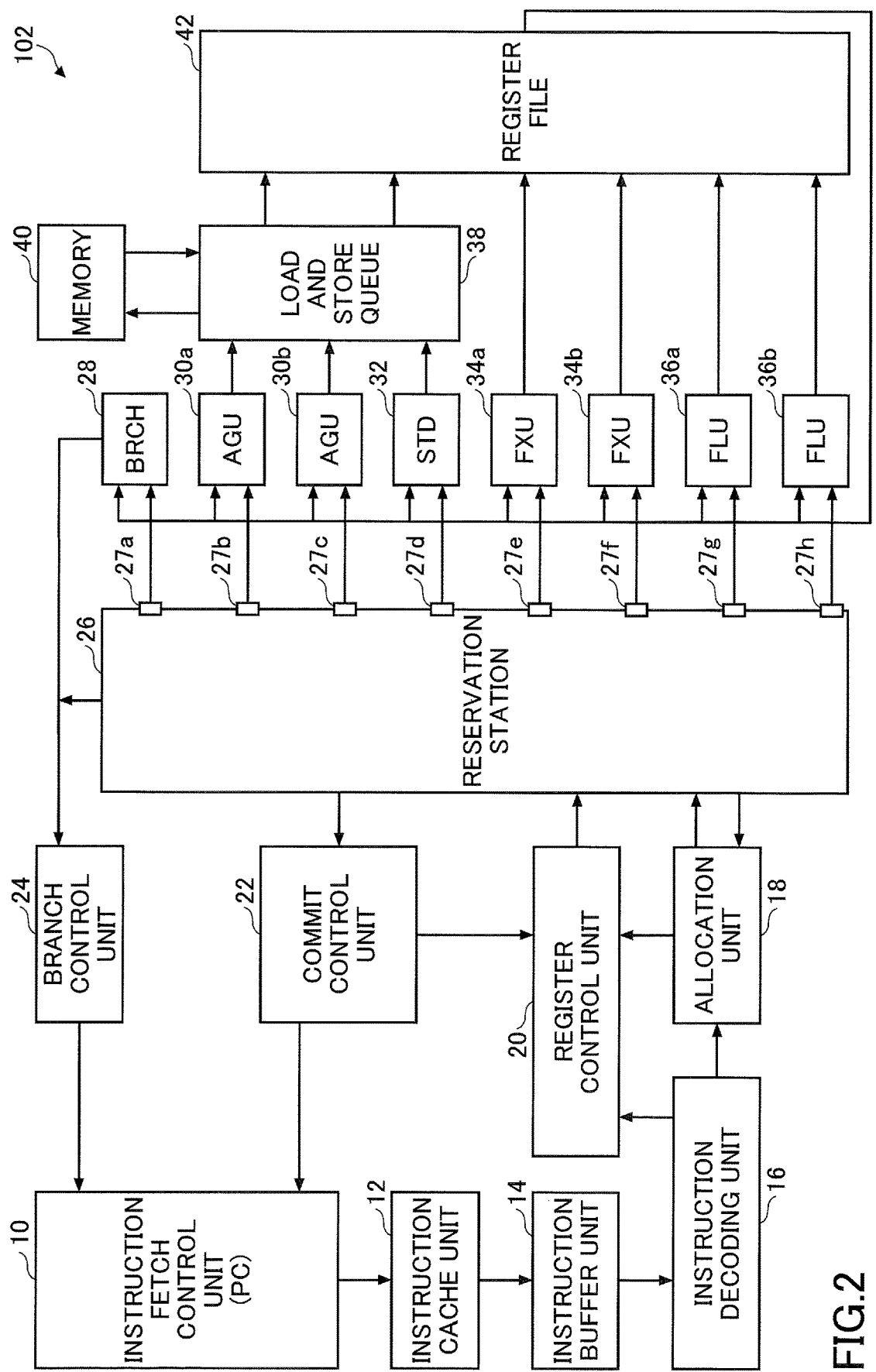
FIG. 2 is a drawing illustrating an example of an arithmetic processing apparatus of another embodiment.

FIG. 2 illustrates an example of an arithmetic processing apparatus of another embodiment. An arithmetic processing apparatus 102 in FIG. 2 includes an instruction fetch control unit 10, an instruction cache unit 12, an instruction buffer unit 14, an instruction decoding unit 16, an allocation unit 18, a register control unit 20, a commit control unit 22, a branch control unit 24, and a reservation station 26. The arithmetic processing apparatus 102 further includes a target address calculation unit (BRCH) 28, a plurality of memory address generation units (AGU) 30 (30a and 30b), and a store data control unit (STD) 32. The arithmetic processing apparatus 102 further includes a plurality of fixed-point operation units (FXU) 34 (34a and 34b), a plurality of floating-point operation units (FLU) 36 (36a and 36b), a load and store queue 38, a memory 40, and a register file 42. In the following, the target address calculation unit 28, the memory address generation unit 30, the store data control unit 32, the fixed-point operation unit 34, and the floating-point operation unit 36 will be also referred to as the execution resource.

The reservation station 26 is an example of an instruction execution control unit. The target address calculation unit 28, the memory address generation units 30a and 30b, the store data control unit 32, the fixed-point arithmetic units 34a and 34b, and the floating-point arithmetic units 36a and 36b are examples of an instruction execution unit. The target address calculation unit 28 is an example of a branch instruction execution unit (i.e., a branch instruction execution circuit). The memory address generation units 30a and 30b are examples of a memory access instruction execution unit (i.e., a memory access instruction execution circuit). The fixed-point operation units 34a and 34b, and the floating-point operation units 36a and 36b are examples of an arithmetic instruction execution unit (i.e., an arithmetic instruction execution circuit).

The arithmetic processing apparatus 102 is a superscalar processor for example, but a scalar processor may be used. In the case of the scalar processor, the arithmetic processing apparatus 102 may include one memory address generation unit 30, one fixed-point operation unit 34, and one floating-point operation unit 36. The configuration of the arithmetic processing apparatus 102 illustrated in FIG. 2 is an example, and may be another configuration of an arithmetic processing apparatus that includes the reservation station 26 with a plurality of issue ports.

The instruction fetch control unit 10 generates an address for fetching the instruction based on an address generated by a program counter PC or an address received from the branch control unit 24, and outputs the generated address to the instruction cache unit 12. The instruction fetch control unit 10 may update the address based on information that indicates an instruction completion and that is sent from the commit control unit 22. The program counter PC may be provided outside of the instruction fetch control unit 10.

The instruction cache unit 12 obtains a plurality of instructions stored in an area indicated by an address received from the instruction fetch control unit 10, and outputs the obtained instructions to the instruction buffer unit 14. The instruction cache unit 12 may be a primary instruction cache for example. When the instruction cache unit 12 does not store instructions corresponding to the address, in order to obtain the instructions from a memory at a lower level, which is not illustrated, the instruction cache unit 12 sends an access request to the memory at a lower level, and obtains the instructions from the memory at a lower level.

The instruction buffer unit 14 stores a plurality of instructions output from the instruction cache unit 12, in the program sequence for example, and outputs a plurality of the instructions from the stored instructions (e.g., two instructions or four instructions) in the in-order sequence to the instruction decoding unit 16. The instruction decoding unit 16 individually decodes a plurality of the instructions output from the instruction buffer unit 14, and outputs instruction data generated by decoding the instructions to the allocation unit 18 and the register control unit 20 in the in-order sequence. The instruction data may be stored in a commit buffer of the commit control unit 22. The instruction data includes a type of instruction, information about registers used for executing the instruction for example. In the following, the instruction data that the instruction decoding unit 16 generates by decoding (i.e., the decoded result) will be also simply referred to as the instruction.

The allocation unit 18 allocates the instruction received from the instruction decoding unit 16 to the execution resource that executes the instruction based on the type of the instruction or the like, and outputs (i.e. dispatch) the instruction including information about the allocation to the reservation station 26. The register control unit 20 changes an allocation of the registers to avoid dependencies of registers included in the register file 42. The register file 42 may include a register used for changing an allocation in addition to a register that can be specified by a register number included in the instruction.

The commit control unit 22 buffers information indicating instructions issued by the reservation station 26 in the in-order sequence, and performs processes to complete the instruction in the sequence written in a program (i.e., in the in-order sequence) based on completion reports of executing the instruction received from an execution resource such as an arithmetic unit, for example. The commit control unit 22 outputs information indicating completion of executing an instruction to the instruction fetch control unit 10 and the register control unit 20, for example. The branch control unit 24 performs a branch prediction based on an address received from the target address calculation unit 28 when a branch instruction is executed, and outputs a result of the branch prediction to the instruction fetch control unit 10. Thus, the branch control unit 24 includes a function of a branch prediction mechanism.

The reservation station 26 is commonly provided to the target address calculation unit 28, the memory address generation units 30a and 30b, the store data control unit 32, the fixed-point arithmetic units 34a and 34b, and the floating-point arithmetic units 36a and 36b. The reservation station 26 is also referred to as a dynamic scheduler or an issue queue. The reservation station 26 buffers instructions sent by the allocation unit 18 in a queue which is not illustrated, and selects an instruction whose dependencies among instructions are resolved, from the instructions buffered in the queue. The reservation station 26 issues the selected instruction to one of the execution resources based on a type of the instruction. Consequently, the reservation station 26 includes issue ports 27 (27a, 27b, 27c, 27d, 27e, 27f, 27g, and 27h) to issue an instruction for the respective execution resources. In the superscalar architecture, for example, the reservation station 26 issues fixed-point arithmetic instructions to the fixed-point arithmetic units 34a and 34b concurrently. The fixed-point arithmetic units 34a and 34b execute the instructions concurrently and store results of the execution to registers.

The target address calculation unit 28 calculates a branch target address, for example, based on a branch instruction received from the reservation station 26 and address data stored in the register file 42, and outputs a calculated address to the branch control unit 24.

The memory address generation units 30a and 30b each generate an address based on a memory access instruction output from the reservation station 26, and output a generated address to the load and store queue 38. The store data control unit 32 sends data output from the register file 42 to the load and store queue 38 when a store instruction is executed.

The fixed-point arithmetic units 34a and 34b each execute a fixed-point arithmetic instruction received from the reservation station 26, and store a result of the execution to a fixed-point register in the register file 42, for example. The floating-point arithmetic units 36a and 36b each execute a floating-point arithmetic instruction received from the reservation station 26, and store a result of the execution to a floating-point register in the register file 42, for example. In the following, the fixed-point arithmetic units 34a and 34b will be also referred to as the arithmetic units FXU 34a and 34b, and the floating-point arithmetic units 36a and 36b will be also referred to as the arithmetic units FLU 36a and 36b.

The load and store queue 38 includes a function to access the memory 40 by using an address output from the memory address generation units 30a and 30b. The load and store queue 38 further includes a load queue storing load data that is read from the memory 40 and a store queue storing store data that is written to the memory 40. The load and store queue 38 reads data from the memory 40 and stores the data in the register file 42 when the instruction decoding unit 16 decodes a load instruction. The load and store queue 38 stores in the memory 40 data received from the register file 42 through the store data control unit 32 when the instruction decoding unit 16 decodes a store instruction. The memory 40 is a data cache, for example. The register file 42 includes a plurality of registers, stores source data in a register corresponding to a source operand included in an instruction, and stores an arithmetic operation result in a register corresponding to a destination operand included in an instruction.

Figure 3:
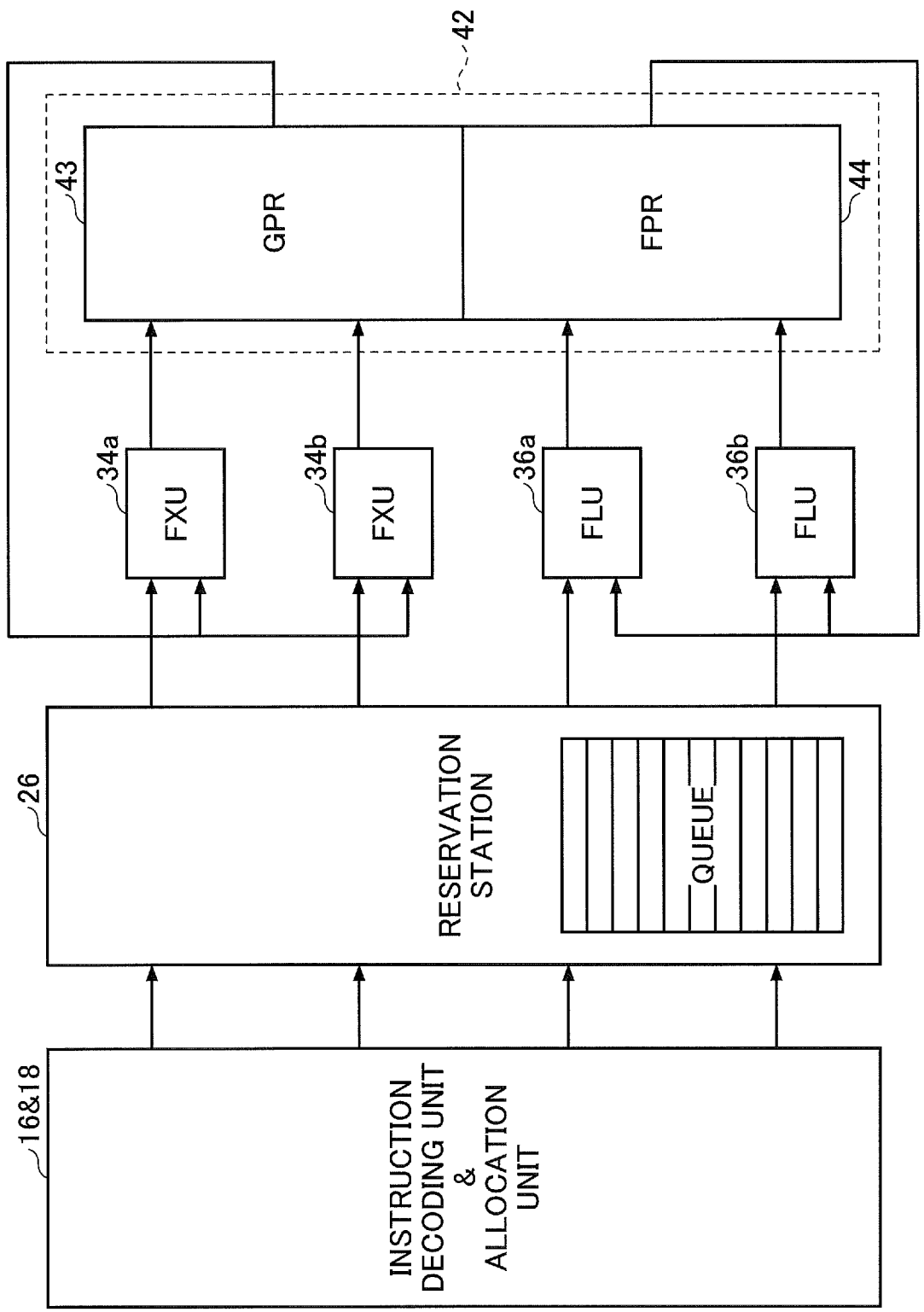
FIG. 3 is a drawing illustrating a reservation station in FIG. 2 and some blocks around the reservation station.

FIG. 3 illustrates the reservation station 26 in FIG. 2 and some blocks around the reservation station 26. The reservation station 26 stores instructions that are decoded by the instruction decoding unit 16 and allocated by the allocation unit 18, in a common queue. For each arithmetic unit of the arithmetic units FXU 34a, FXU 34b, FLU 36a, and FLU 36b, the reservation station 26 issues an instruction that has its dependency resolved and that is executable for an arithmetic unit from the instructions stored in the queue, to an arithmetic unit. The arithmetic units FXU 34a and 34b perform arithmetic operations on data stored in general purpose registers GPR 43 based on instructions, and store arithmetic operation results to general purpose registers GPR 43. The arithmetic units FLU 36a and 36b perform arithmetic operations on data stored in floating point registers FPR 44 based on instructions, and store arithmetic operation results to floating point registers FPR 44.

The arithmetic processing apparatus 102 includes the arithmetic units FXU and FLU, the target address calculation unit 28, the memory address generation unit 30, the store data control unit 32 (which will hereinafter be referred to as an execution resource), and a common reservation station 26. With this configuration, a queue including a plurality of entries ENT storing instruction data in the reservation station 26 can be shared by execution resources, and the number of the entries ENT used by the execution resources can be increased without increasing the size of the reservation station 26. A circuits design devised to enable the queue of the reservation station 26 being shared will be described in FIG. 4.

Figure 4:
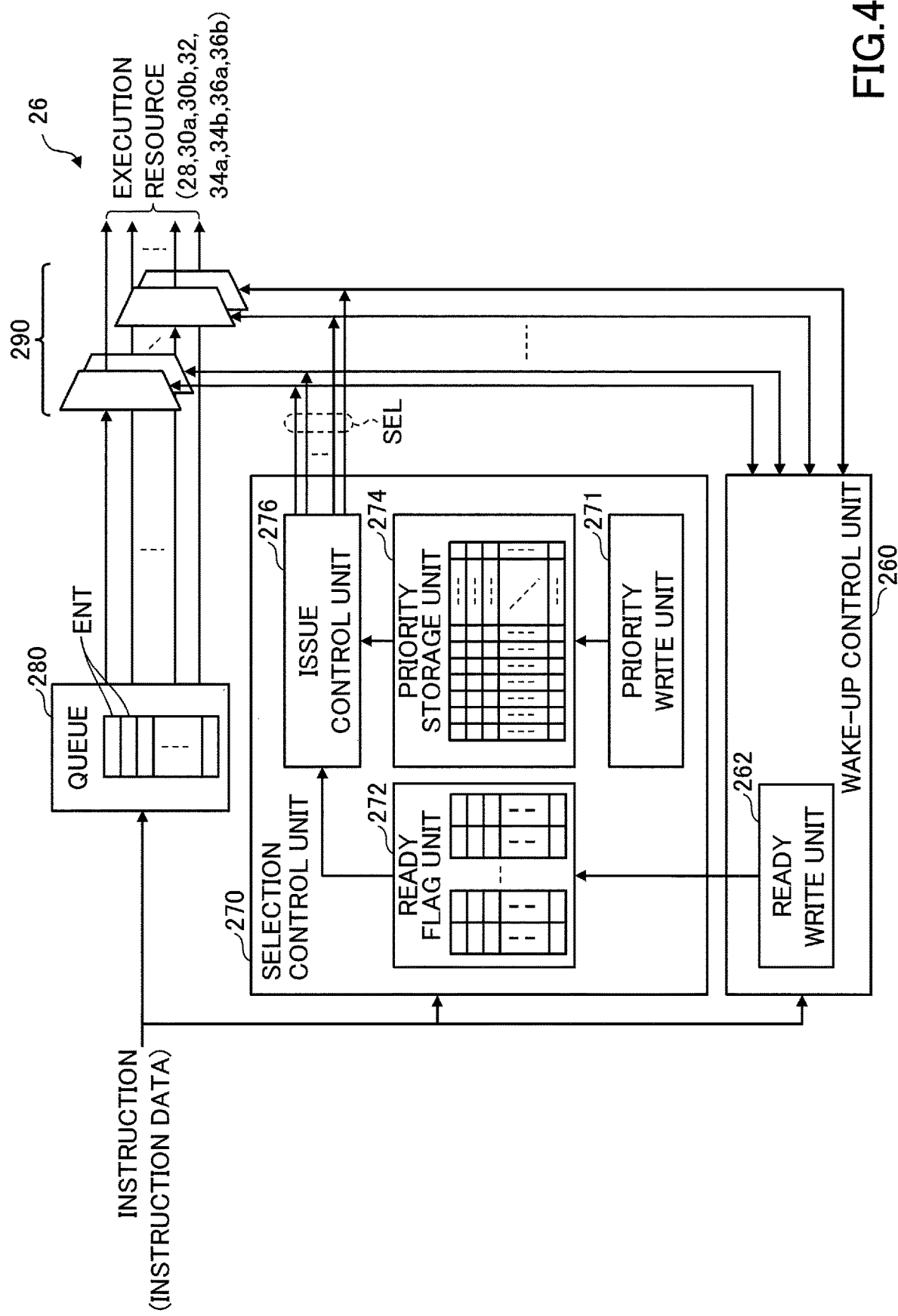
FIG. 4 is a drawing illustrating an example of the reservation station in FIG. 2.

FIG. 4 illustrates an example of the reservation station 26 in FIG. 2. The reservation station includes a wake-up control unit 260, a selection control unit 270, a queue 280 including a plurality of entries ENT, and a plurality of selection units 290 provided to respective execution resources. The wake-up control unit 260 includes a ready write unit 262. The selection control unit 270 includes a priority write unit 271, a ready flag unit 272, a priority storage unit 274, and an issue control unit 276.

The ready write unit 262 is an example of the executable instruction information write unit, and the ready flag unit 272 is an example of the executable instruction information storage unit. The priority write unit 271 is an example of the priority information write unit, and the priority storage unit 274 is an example of the priority information storage unit. The issue control unit 276 is an example of the output determination unit.

The instruction data that the instruction decoding unit 16 generates by decoding are stored in the queue 280 and are dispersedly stored in a queue, which is not illustrated, included in each of the wake-up control unit 260 and the selection control unit 270. Information included in the instruction data stored in the wake-up control unit 260, the selection control unit 270, and the queue 280 may be duplicated.

The wake-up control unit 260 checks a dependency between the instruction and another instruction (i.e., a data hazard) based on addresses of the registers (i.e., source and destination) included in instruction data and a selection signal SEL output from the issue control unit 276. Alternatively, the wake-up control unit 260 may check a resource conflict of a pipeline (i.e., a structural hazard). The wake-up control unit 260 outputs information that causes the selection control unit 270 to select the instruction, when a hazard is not found or a hazard is resolved.

The ready write unit 262 sends a command of writing to the ready flag unit 272, the ready flag indicating that the instruction can be issued, to the selection control unit 270 when a dependency is resolved. The command of writing the ready flag may include information indicating an execution resource. The ready flag (i.e., a ready state R) is an example of the executable instruction information.

The priority write unit 271 determines priority of an instruction based on valid information indicating that an instruction is valid and information indicating the order of instructions, for example, and outputs priority information to the priority storage unit 274 based on a determined result. A preceding instruction of a program may be given higher priority than a subsequent instruction, and a predetermined instruction may be given higher priority, for example.

The selection control unit 270 stores information received from the wake-up control unit 260 and instruction data, and performs an arbitration process for selecting an instruction to be issued based on the stored information. The selection control unit 270 outputs a selection signal SEL to cause the selection unit 290 to select the instruction selected by the arbitration process, to a corresponding execution resource. The selection signal SEL is also sent to the wake-up control unit 260 as information indicating that the instruction has been issued.

The ready flag unit 272 includes flag storage areas in which ready flags are stored for respective execution resources (i.e., vertically aligned areas illustrated in FIG. 4). The number of the flag storage areas per an execution resource is equal to the number of the entries ENT in the queue 280. When the ready flag unit 272 receives a set command to set a ready flag that is corresponding to an instruction to be executed by the fixed-point arithmetic unit 34a, for example, the ready flag unit 272 writes the ready flag to the flag storage area corresponding to the fixed-point arithmetic unit 34a and corresponding to the entry ENT storing the instruction in the queue 280.

The priority storage unit 274 stores priority information indicating relative priority of an instruction stored in a corresponding entry ENT in the queue 280 among instructions stored in the entries ENT. Thus the priority storage unit 274 includes a priority storage row (illustrated in FIG. 5) storing the priority information between a corresponding entry ENT and each of the remaining entries ENT. In other words, the priority storage unit 274 includes a two-dimensional area storing priority information. Generally, priority of the instruction can be determined by one-dimensional priority information for respective entries in the queue 280. In this embodiment, two-dimensional priority information can reduce the number of logical operations of the issue control unit 276 as described later.

The issue control unit 276 selects, for each execution resource of the execution resources, an instruction to be issued to an execution resource based on information stored in the ready flag unit 272 and the priority storage unit 274, and outputs a selection signal SEL indicating an entry ENT in the queue 280 storing the instruction selected to be issued. The selection signals SEL are generated for execution resources independently. Two selection signals SEL corresponding to the floating-point arithmetic units 36a and 36b may be generated at the same time in the superscalar architecture, for example.

The issue control unit 276 determines an instruction to be issued based on logical operations of ready flags stored in the ready flag unit 272 and priority information stored in the priority storage unit 274, for example. Thus, logical operations of the issue control unit 276 to select an instruction to be issued can be partially replaced by operations of the priority storage unit 274, and the number of logical stages of a circuit of the issue control unit 276 can be reduced. For example, the issue control unit 276 can be implemented by AND-OR logic operations, and the number of logical operations of the issue control unit 276 can be reduced compared with another arbitration circuit to select an instruction to be issued. By using dynamic logic for logical operations of the issue control unit 276, an increase of a delay time can be minimized when the number of entries in the queue 280 is increased, and it can contribute to reducing a length of time required for the B2B scheduling.

As described above, similar to the arithmetic processing apparatus 100 illustrated in FIG. 1, a margin of time is created for the B2B scheduling and the number of entries in the queue 280 can be increased. When the number of entries is increased, the number of instructions that can be executed in the out-of-order sequence is increased, and performance of the arithmetic processing apparatus 102 can be improved.

When the number of the entries is not increased, a clock frequency of the arithmetic processing apparatus 102 can be increased and the performance can be improved.

The queue 280 is commonly provided to a plurality of execution resources and includes a predetermined number of the entries ENT (e.g., 16) storing instruction data. Thus, a mix of instructions output to a plurality of the execution resources can be stored in the queue 280. Outputs of entries ENT in the queue 280 are connected to inputs of a plurality of the selection units 290 corresponding to respective execution resources. For example, when there are eight execution resources (28, 30a, 30b, 32, 34a, 34b, 36a and 36b), eight selection units 290 are provided. The outputs of the entries ENT in the queue 280 are connected to the inputs of the eight selection units 290 in parallel. Each selection unit 290 selects a corresponding entry ENT in the queue 280 indicated by the selection signal SEL when the selection unit 290 receives a selection signal SEL from the issue control unit 276, and issues an instruction data stored in the entry ENT to a corresponding execution resource.

FIG. 5 illustrates an example of the ready flag unit 272 and the priority storage unit 274 in FIG. 4. The ready flag unit 272 includes flag storage areas including sixteen storage areas storing ready flags for respective sixteen entries ENT in the queue 280 illustrated in FIG. 4, for each execution resource. The configuration of the flag storage area in the ready flag unit 272 is similar to the configuration of the executable instruction information storage unit 5 illustrated in FIG. 1.

The priority storage unit 274 includes a priority storage row including fifteen areas (i.e., a row of areas aligned horizontally in FIG. 5) that store priority information between a corresponding entry ENT and each of the remaining entries of sixteen entries ENT in the queue 280 illustrated in FIG. 4. The priority storage row is an example of storage areas in which priority information is stored, such that the priority information stored in the storage areas for a given entry ENT indicates whether an instruction stored in an entry ENT corresponding to each column of the storage areas has higher priority than an instruction stored in the given entry ENT.

The configuration of the priority storage unit 274 is similar to the configuration of the priority information storage unit 7 illustrated in FIG. 1. The priority storage unit 274 is also described as a priority storage unit that includes priority storage columns including fifteen areas (i.e., a column of areas aligned vertically in FIG. 5) that store the priority information between an entry ENT corresponding to the column and each of remaining entries ENT.

FIG. 6 illustrates an example of an operation of the issue control unit 276 in FIG. 4. In other words, FIG. 6 illustrates an example of conditions in which the reservation station 26 in FIG. 4 issues the instruction. FIG. 6 illustrates conditions in which an instruction is issued for a corresponding execution resource.

The issue control unit 276 performs as follows, when information, which is stored in the ready flag unit 272, corresponding to a target instruction to be issued that is stored in one of the entries ENT of the queue 280, does not indicate a ready status in which the instruction can be issued (i.e., Not Ready). The issue control unit 276 does not output a selection signal SEL that issues the instruction targeted to be issued, regardless of information stored in the priority storage unit 274 (i.e., (a), (b) and (c) in FIG. 6).

The issue control unit 276 performs as follows, when information, which is stored in the ready flag unit 272, corresponding to a target instruction to be issued that is stored in one of the entries ENT of the queue 280, indicates the ready status in which the instruction can be issued (i.e., Ready). When at least one of the instructions that is higher priority than the target instruction to be issued indicates the ready status, the issue control unit 276 does not output a selection signal SEL that issues the target instruction to be issued (i.e., (d) in FIG. 6). When all the instructions that have higher priority than the target instruction to be issued do not indicate the ready status, the issue control unit 276 outputs the selection signal SEL that issues the target instruction to be issued (i.e., (e) in FIG. 6). When none of the instructions is higher priority than the target instruction to be issued, the issue control unit 276 outputs the selection signal SEL that issues the target instruction to be issued without checking the ready status of the ready flag unit 272 (i.e., (f) in FIG. 6).

The condition S to issue the instruction illustrated in FIG. 6 is expressed in the following formula (1).

$$S:=\sim(P\times R)\&R \qquad (1)$$

In the (P×R) of the formula (1), "P" indicates the priority of one of the instructions that are not targeted to be issued and "R" indicates the ready status of one of the instructions that are not targeted to be issued. "R" after "&" indicates the ready status of the instruction targeted to be issued. (P×R) is evaluated for all the entries ENT in the queue 280 except an entry ENT that stores the instruction targeted to be issued.

In the formula (1), "P" of the (P×R) is acquired by referring to the priority storage unit 274. "P" is a value "1" when an evaluated instruction is higher priority than the target instruction to be issued, and "P" is a value "0" when an evaluated instruction is lower priority than the target instruction to be issued. Both "R"s in the formula (1) are acquired by referring to the ready flag unit 272. "R" is a value "1" when a state is READY illustrated in FIG. 6, and is a value "0" when a state is Not READY illustrated in FIG. 6. The symbol "~" in the formula (1) indicates logical negation.

The target instruction to be issued is issued when the condition "S" that is a logical operation result of the formula (1) indicates the value "1", and is not issued when the condition "S" indicates the value "0". The issue control unit 276 performs the determination illustrated in FIG. 6 (i.e., the evaluation of the formula (1)) for all entries ENT in the queue 280 storing the instructions (i.e., the valid entries ENT). As described later, priority of an instruction stored in the entry ENT in the queue 280 can be uniquely determined by using the priority storage unit 274 in a matrix state. As a result, issuing an instruction by using a wrong priority order can be avoided when the determination illustrated in FIG. 6 is performed for all entries ENT storing instructions, for example.

Figure 7:
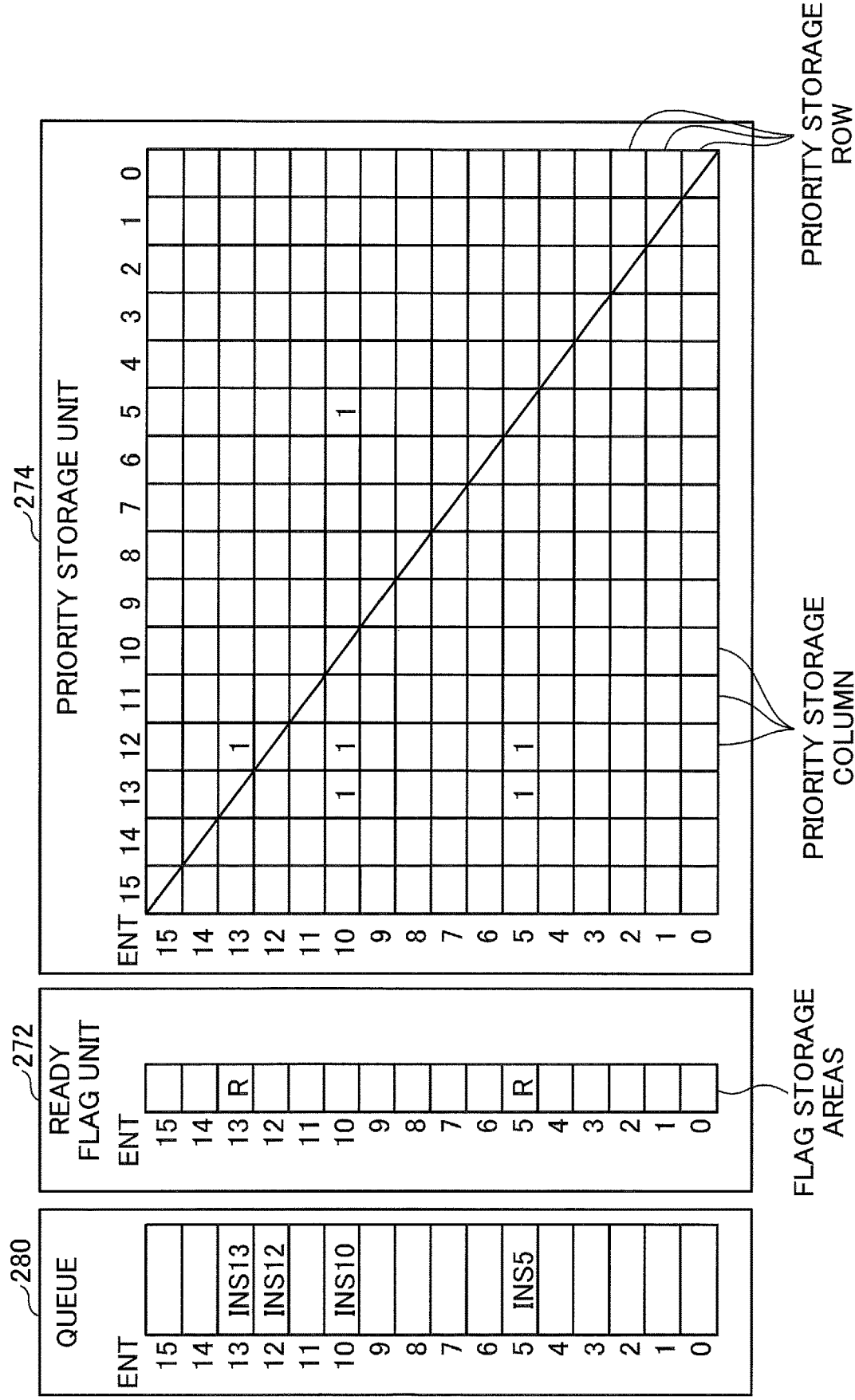
FIG. 7 is a drawing illustrating an example of an operation of the reservation station in FIG. 4.

FIG. 7 illustrates an example of an operation of the reservation station 26 in FIG. 4. The ready flag unit 272 illustrated in FIG. 7 indicates a flag storage area corresponding to one of execution resources.

In FIG. 7, the instructions INS13, INS12, INS10, and INS5 are stored in the entries ENT13, ENT12, ENT10, and ENT5 in the queue 280 respectively, and the instructions INS13 and INS5 are in a ready state R in which instructions can be issued (i.e., READY illustrated in FIG. 6). Based on the priority information stored in the priority storage unit 274, INS12, INS13, INS5, and INS10 are in order of high to low priority for issuing an instruction.

In the priority storage unit 274, the value "1" of the entry ENT12 stored in the priority storage row of the entry ENT13 indicates that the instruction INS12 is higher priority than the instruction INS13. Because there are no instances of the value "1" in the priority storage row of the entry ENT12, the priority of the instruction INS12 is indicated as the highest. The values "1" of the entries ENT13, ENT12 and ENT5 stored in the priority storage row of the entry ENT10 indicate that the instructions INS13, INS12 and, INS5 are higher priority than the instruction INS10. Thus, the instruction INS10 is the lowest priority. The values "1" of the entries ENT13 and ENT12 stored in the priority storage row of the entry ENT5 indicate that the instructions INS13 and INS12 are higher priority than the instruction INS5. Because the value "1" is not stored in the area corresponding to the entry ENT10 in the priority storage row of the entry ENT5, the priority of the instruction INS5 is higher than the priority of the instruction INS10.

In a state illustrated in FIG. 7, according to the condition for the determination illustrated in FIG. 6 and the formula (1), the issue control unit 276 does not issue the instruction INS12 that is the highest priority because the instruction INS12 is not in the ready state R. The issue control unit 276 determines to issue the instruction INS13 because the instruction INS13 is second priority and is in the ready state R.

Figure 8:
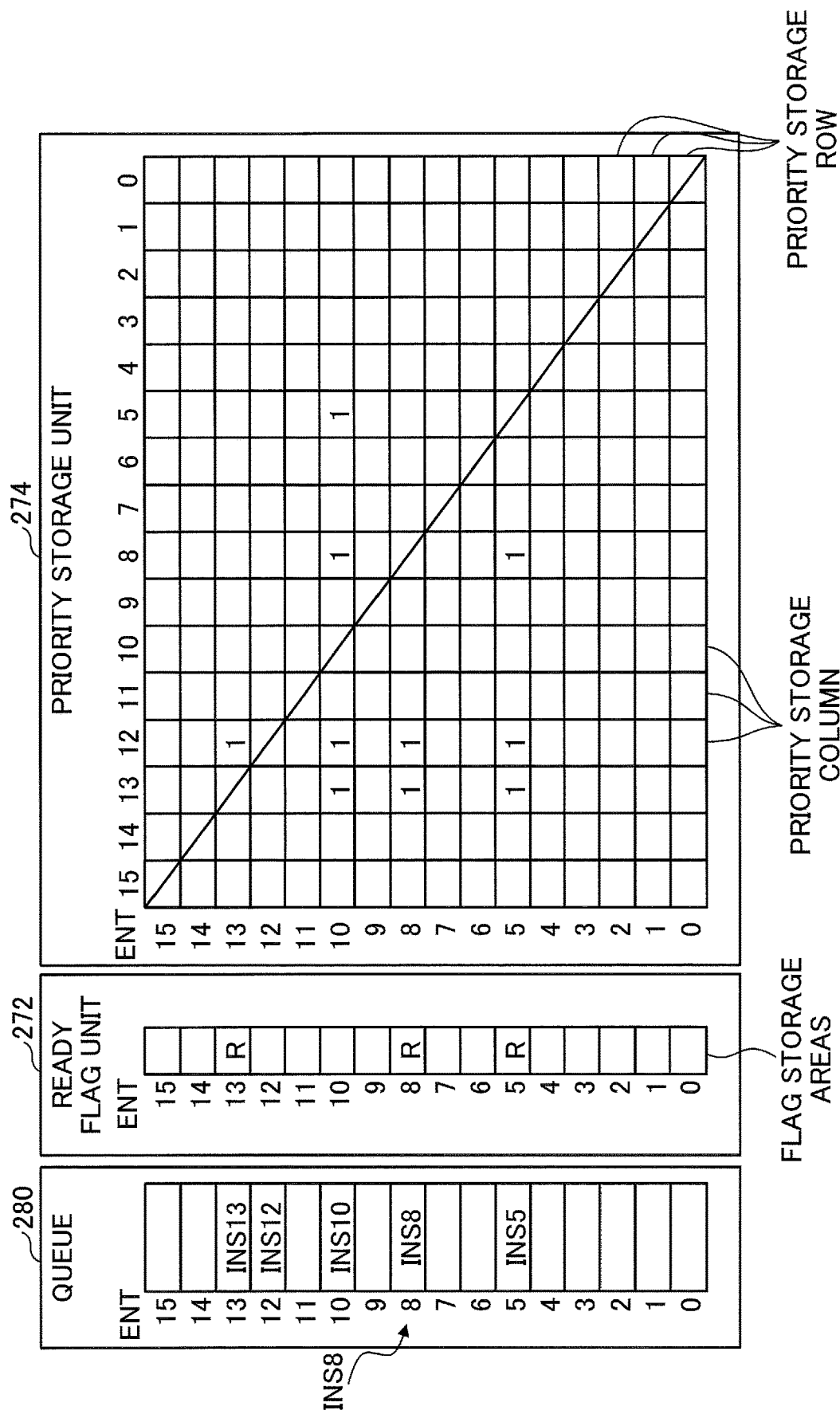
FIG. 8 is a drawing illustrating another example of an operation of the reservation station in FIG. 4.

FIG. 8 illustrates another example of the operation of the reservation station 26 in FIG. 4. Detailed description will not be repeated about operations that are same as or similar to operations illustrated in FIG. 7. Similarly as illustrated in FIG. 7, the ready flag unit 272 illustrated in FIG. 8 is a flag storage area corresponding to one of execution resources.

In FIG. 8, with respect to the state illustrated in FIG. 7, the instruction INS8 decoded by the instruction decoding unit 16 is stored in the entry ENT8 in the queue 280. The ready write unit 262 determines that the instruction INS8 can be issued, and writes the ready state R to an area corresponding to the entry ENT8. The priority write unit 271 determines the priority of the instruction INS8 with respect to the instructions INS13, INS12, INS10 and INS5. The priority write unit 271 determines that the instruction INS8 is lower priority than the instructions INS13 and INS12, and is higher priority than the instructions INS10 and INS5, for example.

The priority write unit 271 writes the value "1" to areas of the entries ENT13 and ENT12 in the priority storage row of the entry ENT8 based on the determined priority. The priority write unit 271 also writes the value "1" to areas of the entries ENT10 and ENT5 in the priority storage column of the entry ENT8.

Thus, every time the instruction INS is stored in the entry ENT in the queue 280, the priority write unit 271 updates information stored in the priority storage row and the priority storage column that are corresponding to the instruction INS, in the priority storage unit 274. As a result, the priority of the instruction INS to be issued is updated and the order of high to low priority is changed from INS12>INS13>INS5>INS10 to INS12>INS13>INS8>INS5>INS10, based on the priority information stored in the priority storage unit 274.

As described in FIG. 8, every time the instruction INS is stored in the entry ENT in the queue 280, the priority write unit 271 updates the priority storage row and the priority storage column in the priority storage unit 274 that are corresponding to the entry ENT storing the instruction INS. The issue control unit 276 can select the instruction INS to be issued by "1hot0" based on the formula (1). "1hot0" indicates that the instruction INS stored in one of the entries ENT is issued or no instruction INS is issued. Thus, when the priority storage unit 274 in the matrix state is used, a priority order of the instruction INS can be uniquely determined and the instruction INS can be selected based on the priority order.

According to a state illustrated in FIG. 8, similarly as illustrated in FIG. 7, the issue control unit 276 does not issue the instruction INS12 that is the highest priority, and determines to issue the instruction INS13 that is the second highest priority. If the states of the ready write unit 262 and the priority write unit 271 are not changed, the issue control unit 276 determines to issue the instruction INS8 that is the third highest priority and is in the ready state R.

Figure 9:
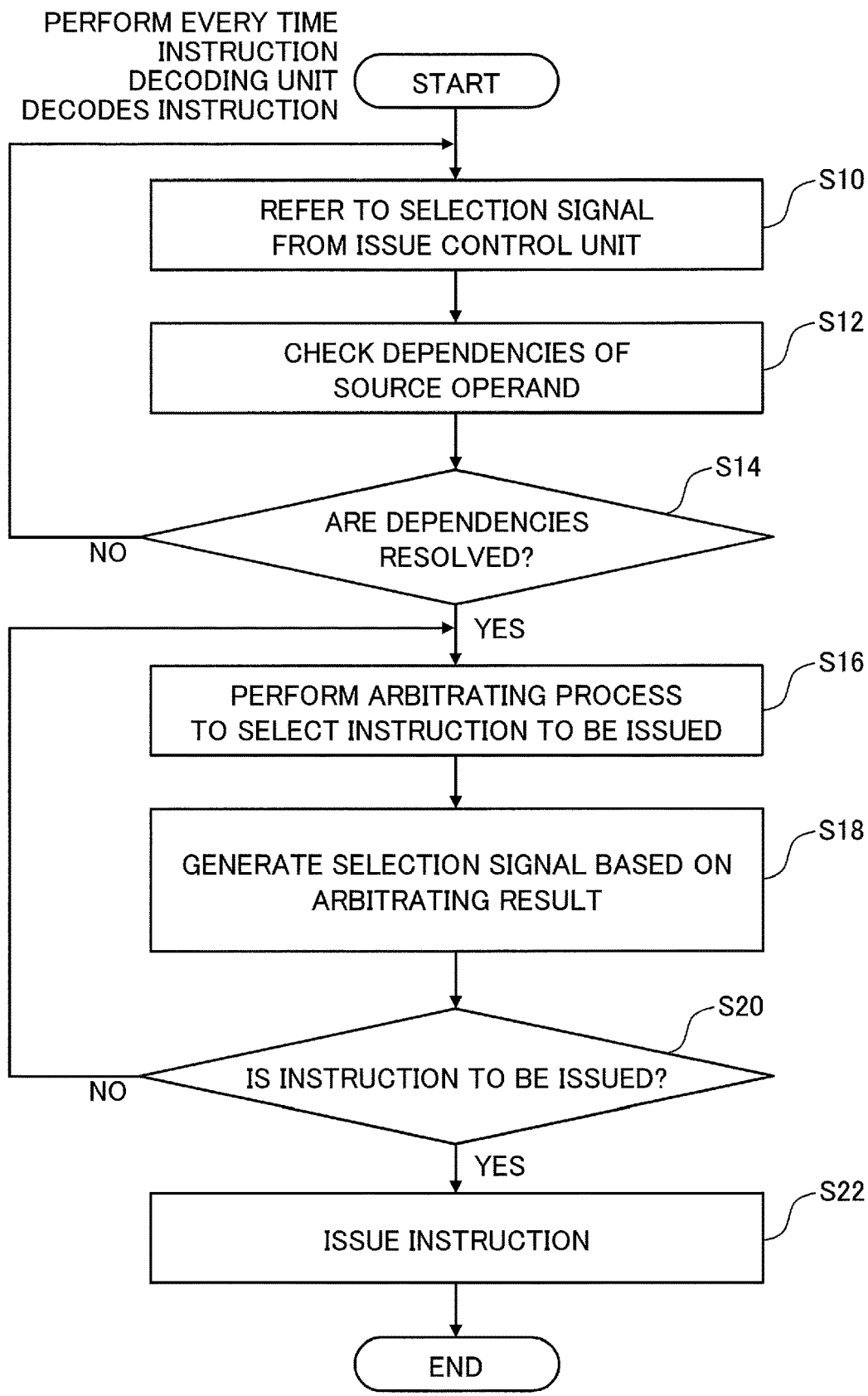
FIG. 9 is a drawing illustrating an example of an operational flow chart of the reservation station in FIG. 3.

FIG. 9 illustrates an example of an operational flow chart of the reservation station 26 in FIG. 3. Thus, FIG. 9 illustrates an example of a method to control the arithmetic processing apparatus 102. The operational flow illustrated in FIG. 9 is performed every time the instruction INS is decoded by the instruction decoding unit 16.

In step S10, the wake-up control unit 260 refers to the selection signal SEL output from the issue control unit 276. In step S12, the wake-up control unit 260 checks dependencies of the source operand of the instruction INS. In step S14, when the dependencies are resolved, the wake-up control unit 260 outputs information to cause the selection control unit 270 to select the instruction INS, and the operation moves to step S16. When the dependencies are not resolved, the operation returns to step S10.

In step S16, the selection control unit 270 performs an arbitration process to select the instruction INS to be issued based on the information stored in the ready flag unit 272 and the priority write unit 271. In step S18, the selection control unit 270 generates the selection signal SEL corresponding to the entry ENT in the queue 280 storing the instruction INS to be issued based on the result of the arbitration process. The selection signal SEL is sent to the selection unit 290 and the wake-up control unit 260.

In the B2B scheduling for executing the instruction INS with latency 1 in order, the operations from the generation of the selection signal SEL in steps S16 and S18 to the completion of steps S10, S12, and S14 are necessary to be executed in 1 clock cycle. Consequently, the B2B scheduling for executing the instruction INS with latency 1 in order requires strictest timing. However, the number of logical operations of the issue control unit 276 can be reduced with this embodiment, and a margin of time can be created for the B2B scheduling, for example. As a result, in an instruction pipeline of an arithmetic processing apparatus, the delay time of a stage to select the instruction that the instruction execution control unit issues can be shorten.

In step S20, when the instruction INS can be issued, the operation of the selection unit 290 moves to step S22, and when the instruction INS cannot be issued, the operation moves to step S16. In step S22, the reservation station 26 issues the instruction INS to the execution resource, and the operation is finished.

In the embodiments illustrated in FIG. 2 to 9, similarly in the embodiments illustrated in FIG. 1, additional entries of the queue 280, equivalent to a margin of time for the B2B scheduling, can be provided to the reservation station 26. Alternatively, the number of entries to join the arbitration process of the issue control unit 276 can be increased. As a result, the number of instructions that can be executed in the out-of-order sequence can be increased and the performance of the arithmetic processing apparatus 102 can be improved. When the number of the entries is not increased, a clock frequency of the arithmetic processing apparatus 102 can be increased and the performance can be improved.

Additionally, according to the embodiments illustrated in FIG. 2 to 9, by applying the reservation station 26 including the ready flag unit 272 and the priority storage unit 274 illustrated in FIG. 5, multiple issue ports 27 can be provided to the reservation station 26. In this case, it is not necessary to increase the size of the priority storage unit 274, and a flag storage area of the ready flag unit 272 is required only for each execution resource. Thus, the issue control unit 276 can select the instruction INS to be issued for each execution resource based on common priority information stored in the priority storage unit 274. Consequently, regardless of the number of execution resources connected to the reservation station 26, loads of the issue control unit 276 can be kept unchanged. As a result, degradation of the performance of the arithmetic processing apparatus 102 can be avoided when the multiple issue ports 27 are provided to the reservation station 26.

The reservation station 26 illustrated in FIG. 4 includes the flag storage area (i.e., the ready flag) for each execution resource and the common priority storage unit 274 for execution resources, and is the configuration that suppresses an influence on the processing time of the issue control unit 276 caused by increasing issue ports 27. Consequently, when the issue ports 27 are increased, an increased time for the B2B scheduling can be minimized and the issue ports 27 can be increased without decreasing the entries ENT of the queue 280. When the issue ports 27 are not increased, a margin of time is created for the B2B scheduling, and the number of the entries of the queue 280 can be increased by using logical operations equivalent to a margin of time for the B2B scheduling.

The queue 280 can be shared with a plurality of the execution resources and the entry ENT of the queue 280 can be used without any waste when the number of instructions allocated to the same type of execution resources is unbalanced and processing frequency of execution resources are unbalanced. In other words, compared with the reservation station provided to each execution resource, the number of the entries ENT for one of the execution resources can be increased. As a result, the performance of the arithmetic processing apparatus 102 can be improved.

FIG. 10 illustrates an example of a reservation station in an arithmetic processing apparatus of another embodiment. The arithmetic processing apparatus including the reservation station 26A illustrated in FIG. 10 is a superscalar processor, for example. The reservation station 26A includes the ready flag unit 272 and the priority storage unit 274 similarly illustrated in FIG. 7, and a queue 280A that includes a priority flag PRI in addition to the queue 280 illustrated in FIG. 7. The other configuration of the arithmetic apparatus including the reservation station 26A illustrated in FIG. 10 is same as or similar to the configuration of the arithmetic processing apparatus 102.

The priority flag PRI of each entry ENT in the queue 280 stores "n" indicating a normal priority level or "h" indicating higher priority than "n". For example, the priority flag PRI is one bit, and a logical value of 0 and a logical value of 1 indicate "n" and "h", respectively. Whether the priority level of the instruction INS is "n" or "h" is determined for each instruction INS in advance. Thus, the instruction decoding unit 16 (illustrated in FIG. 2) determines "n" or "h" stored in the priority flag PRI.

In FIG. 10, the instructions INS15, INS14, INS13, INS12, INS9, INS6, INS1, and INS0 are stored in the entry ENT15, ENT14, ENT13, ENT12, ENT9, ENT6, ENT1, and ENT0 in the queue 280 respectively. The priority levels of the instructions INS15, INS14, INS13, INS12, INS9, INS6, INS1, and INS0 are "n", "n", "h", "h", "h", "h", "n", and "n", respectively.

The instruction decoding unit 16 decodes two instructions INS and stores two decoded instructions INS (i.e., instruction data generated by decoding) in the queue 280 at one time, for example. According to an example illustrated in FIG. 10, the instruction decoding unit 16 stores a pair of instructions INS15 and INS14, a pair of instructions INS13 and INS12, a pair of instructions INS1 and INS0, and a pair of instructions INS9 and INS6 in the queue 280 in this order.

When new instructions INS are stored in the queue, the priority write unit 271 (illustrated in FIG. 4) stores a value "1" or "0" to the priority storage row and the priority storage column corresponding to the stored instructions INS. With regard to the priority storage row, the value "1" indicates that another instruction INS is higher priority than the instruction INS being stored in the queue 280, and the value "0" indicates lower priority. With regard to the priority storage column, the value "1" indicates that another instruction INS is lower priority than the instruction INS being stored in the queue 280, and the value "0" indicates higher priority.

In the following, a case that the instructions INS9 and INS6 are stored in the entries ENT9 and ENT6 in the queue 280 respectively will be described. For example, the instruction INS6 is previous to the instruction INS9 in the program execution order. Thus, the instruction INS6 is higher priority than the instruction INS9.

The priority write unit 271 forcibly writes the value "0" to areas corresponding to the instructions INS15, INS14, INS1, and INS0, which have the priority level "n", in the priority storage row corresponding to the instructions INS9 and INS6, which have the priority level "h". The instructions INS13 and INS12 having the same priority level "h" are earlier in the program execution sequence, and higher priority. Thus, the priority write unit 271 writes the value "1" to the areas corresponding to the instruction INS13 and INS12 in the priority storage row corresponding to the instructions INS9 and INS6.

The priority write unit 271 writes the value "1" indicating a higher priority to an area corresponding to the instruction INS6 in the priority storage row corresponding to the instruction INS9. The priority write unit 271 writes the value "0" indicating a lower priority to an area corresponding to the instruction INS9 in the priority storage row corresponding to the instruction INS6.

The priority write unit 271 forcibly writes the value "1" to the areas corresponding to the instructions INS15, INS14, INS1, and INS0 in the priority storage columns corresponding to the instructions INS9 and INS6. This is because the priority levels of the instructions INS15, INS14, INS1, and INS0 (i.e., "n") are lower than the priority levels of the instructions INS9 and INS6 (i.e., "h"). The priority write unit 271 writes the value "0" to areas corresponding to the instructions INS13 and INS12 that are earlier in the program execution order in the priority storage column corresponding to the instructions INS9 and INS6.

As described above, the priority write unit 271 writes the value "1" or "O" to the priority storage unit 274 based on the priority with respect to the priority flag PRI and the program execution order. Consequently, when the priority level is specified for instructions INS and the specified instructions INS are issued preferentially from the reservation station 26A, an increase of the size of circuits of the reservation station 26A can be avoided.

If issuing preferentially for some types of instructions from instructions INS that the arithmetic processing apparatus executes by the reservation station 26A improves the performance of the overall arithmetic processing apparatus, the priority level may be specified for instructions INS. In this case, the instruction decoding unit 16 (illustrated in FIG. 2) determines priority of the decoded instruction INS, and outputs information in accordance with the determined result (i.e., "n" or "h") to the reservation station 26A through the allocation unit 18.

For example, if the reservation station is separately provided for a priority level specified for instructions INS, the queue 280 is separately provided for a priority level, and the size of the circuit is increased. In contrast, according to FIG. 10, the queue 280 in one reservation station 26A can store the instructions INS with a plurality of priority levels. Regardless of the number of the priority levels, only one priority storage unit 274 is necessary. As a result, the size of the circuit of the reservation station 26A can be decreased and a chip size of the arithmetic processing apparatus can be decreased.

Three or more priority levels may be stored by extending the priority flag PRI to multiple bits. In this case, three or more priority levels can be stored in the only one queue 280, and only one priority storage unit 274 is necessary regardless of the number of the priority levels.

The embodiment illustrated in FIG. 10 can also obtain an effect similar to the embodiments illustrated in FIG. 1 to FIG. 9. Additionally, according to the embodiment illustrated in FIG. 10, only one reservation station 26A can perform the issue control of instructions INS when a priority level of a specified instruction INS is different from a priority level of another instruction INS. In this case, the priority storage unit 274 illustrated in FIG. 5 can be used only by adding the priority flag PRI to the queue 280. Thus, an increase of the circuit size of the reservation station 26A is minimized, and the issue control of a plurality of types of instructions INS with different priority levels can be performed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An arithmetic processing apparatus, comprising:
an instruction decoding circuit configured to decode an instruction;
an instruction execution control circuit configured to store an instruction decoded by the instruction decoding circuit in an entry of entries, and configured to output an executable instruction from an entry of the entries; and
a plurality of instruction execution circuits, each of the plurality of instruction execution circuits being configured to execute a corresponding executable instruction output from the instruction execution control circuit,
wherein the instruction execution control circuit includes:
an executable instruction information storage circuit configured to store executable instruction information that indicates whether an instruction stored in one of the entries is executable;

a priority information storage circuit configured to include, separately for each of the entries, storage areas in which priority information is stored, such that the priority information stored in the storage areas for a given entry of the entries indicates whether an instruction stored in the given entry has higher priority than one or more other instructions currently being stored in the entries on an entry-by-entry basis;

an executable instruction information write circuit configured to write the executable instruction information to the executable instruction information storage circuit in response to determining whether an instruction stored in one of the entries is executable;

a priority information write circuit configured to write the priority information to the priority information storage circuit in the storage areas for one of the entries in response to determining whether an instruction to be stored in the one of the entries has higher priority than one or more other instructions currently being stored in the entries; and an output determination circuit configured to select an entry of the entries from which an instruction is output on a basis of the executable instruction information stored in the executable instruction information storage circuit and the priority information stored in the priority information storage circuit in the storage areas for the entry from which the instruction is output, wherein:

the executable instruction information storage circuit is provided to the plurality of instruction execution circuits, the executable instruction information storage circuit includes executable instruction information storage areas, separately for each of the entries, the executable instruction information storage areas respectively corresponding to the plurality of instruction execution circuits, the executable instruction information storage areas being provided to the plurality of instruction execution circuits on a one-to-one basis, and each of the entries corresponding to the executable instruction information storage areas, the executable instruction information write circuit writes the executable instruction information in a first executable instruction information storage area among the executable instruction information storage areas, in response to determining whether an instruction stored in a first entry among the entries is executable by a first instruction execution circuit among the plurality of instruction execution circuits, the first executable instruction information storage area corresponding to the first entry and the first instruction execution circuit, the output determination circuit selects the entry from which the instruction is output, based on the executable instruction information stored in the executable instruction information storage areas of the executable instruction information storage and the priority information in the storage areas for the entry from which the instruction is output, each of the entries includes areas that store an instruction and a priority flag indicating a priority level specified for that instruction, the priority level being used to determine which instruction is preferentially executed by the instruction execution circuits, and the priority level being determined for each instruction, the priority information write circuit writes the priority information to the priority information storage circuit in the storage areas for a particular entry of the entries on a basis of the priority level specified for an instruction to be stored in the particular entry of the entries and one or more priority flags currently being stored in the entries, and the priority information write circuit writes the priority information to the priority information storage circuit in the storage areas for a selected entry among the entries, in response to a new instruction being stored in the selected entry among the entries when one or more instructions are already stored in entries among the entries, based on a result of comparing a priority flag stored in the selected entry of the new instruction and one or more priority flags stored in the entries of the one or more instructions.

2. The arithmetic processing apparatus as claimed in claim 1, wherein the priority information in the storage entries for the given entry indicates that the instruction stored in the given entry has higher priority or lower priority than the one or more other instructions currently being stored in the entries on the entry-by-entry basis.

3. The arithmetic processing apparatus as claimed in claim 1, wherein each of the instruction execution circuits is one of an arithmetic instruction execution circuit that executes an arithmetic instruction, a memory access instruction execution circuit that executes a memory access instruction, and a branch instruction execution circuit that controls execution of a branch instruction.

4. The arithmetic processing apparatus as claimed in claim 1, wherein the output determination circuit selects an entry storing an instruction that is executable on a basis of the executable instruction information stored in the executable instruction information storage circuit, and that has highest priority on a basis of priority information stored in the priority information storage circuit among executable instructions in a case in which a plurality of instructions are executable.

5. A method of controlling an arithmetic processing apparatus including an instruction decoding circuit configured to decode an instruction, an instruction execution control circuit configured to store an instruction decoded by the instruction decoding circuit in an entry of entries, and configured to output an executable instruction from an entry of the entries, and an instruction execution circuit configured to execute the executable instruction output from the instruction execution control circuit, the method comprising:

writing, by an executable instruction information write circuit, executable instruction information to an executable instruction information storage circuit in response to determining whether an instruction stored in one of the entries is executable;

writing, by a priority information write circuit, priority information to a priority information storage circuit in response to determining whether an instruction to be stored in one of the entries has higher priority than one or more other instructions currently being stored in the entries; and selecting, by an output determination circuit, an entry of the entries from which an instruction is output, on a basis of the executable instruction information stored in the executable instruction information storage circuit and the priority information stored in the priority information storage circuit, wherein:

each of the entries includes areas that store an instruction and a priority flag indicating a priority level specified for that instruction, the priority level being used to determine which instruction is preferentially executed by the instruction execution circuit, and the priority level being determined for each instruction, the writing of the priority information includes writing the priority information to the priority information storage circuit on a basis of the priority level specified for an instruction to be stored in an entry of the entries and one or more priority flags currently being stored in the entries, and the writing of the priority information includes writing the priority the writing of the priority information includes writing the priority information to the priority information storage circuit, in response to a new instruction being stored in an entry among the entries when one or more instructions are already stored in entries among the entries, based on a result of comparing a priority flag stored in the entry of the new instruction and one or more priority flags stored in the entries of the one or more instructions.

6. An arithmetic processing apparatus, comprising:

an instruction decoding circuit configured to decode an instruction;

an instruction execution control circuit configured to store an instruction decoded by the instruction decoding circuit in an entry of entries, and configured to output an executable instruction from an entry of the entries; and an instruction execution circuit configured to execute the executable instruction output from the instruction execution control circuit, wherein:

the instruction execution control circuit includes:

an executable instruction information storage circuit configured to store executable instruction information that indicates whether an instruction stored in one of the entries is executable;

a priority information storage circuit configured to include, separately for each of the entries, storage areas in which priority information is stored, such that the priority information stored in the storage areas for a given entry of the entries indicates whether an instruction stored in the given entry has higher priority than one or more other instructions currently being stored in the entries on an entry-by-entry basis;

an executable instruction information write circuit configured to write the executable instruction information to the executable instruction information storage circuit in response to determining whether an instruction stored in one of the entries is executable by the instruction execution circuit;

a priority information write circuit configured to write the priority information to the priority information storage circuit in the storage areas for one of the entries in response to determining whether an instruction to be stored in the one of the entries has higher priority than one or more other instructions currently being stored in the entries; and an output determination circuit configured to select an entry of the entries from which an instruction is output on a basis of the executable instruction information stored in the executable instruction information storage circuit and the priority information stored in the priority information storage circuit in the storage areas for the entry from which the instruction is output, wherein:

each of the entries includes areas that store an instruction and a priority flag indicating a priority level specified for that instruction, the priority level being used to determine which instruction is preferentially executed by the instruction execution circuit, and the priority level being determined for each instruction, the priority information write circuit writes the priority information to the priority information storage circuit in the storage areas for a particular entry of the entries on a basis of the priority level specified for an instruction to be stored in the particular entry of the entries and one or more priority flags currently being stored in the entries, and the priority information write circuit writes the priority information to the priority information storage circuit in the storage areas for a selected entry among the entries, in response to a new instruction being stored in the selected entry among the entries when one or more instructions are already stored in entries among the entries, based on a result of comparing a priority flag stored in the selected entry of the new instruction and one or more priority flags stored in the entries of the one or more instructions.

7. The arithmetic processing apparatus as claimed in claim 6, wherein the priority information in the storage entries for the given entry indicates that the instruction stored in the given entry has higher priority or lower priority than the one or more other instructions currently being stored in the entries on the entry-by-entry basis.

8. The arithmetic processing apparatus as claimed in claim 6, wherein each of the instruction execution circuits is one of an arithmetic instruction execution circuit that executes an arithmetic instruction, a memory access instruction execution circuit that executes a memory access instruction, and a branch instruction execution circuit that controls execution of a branch instruction.

9. The arithmetic processing apparatus as claimed in claim 6, wherein the output determination circuit selects an entry storing an instruction that is executable on a basis of the executable instruction information stored in the executable instruction information storage circuit, and that has highest priority on a basis of priority information stored in the priority information storage circuit among executable instructions in a case in which a plurality of instructions are executable.

* * * * *